(12) United States Patent
Le Goffic et al.

(10) Patent No.: US 10,872,043 B2
(45) Date of Patent: Dec. 22, 2020

(54) SYSTEMS AND METHODS FOR INTEGRITY CHECKING OF CODE OR DATA IN A MIXED SECURITY SYSTEM WHILE PRESERVING CONFIDENTIALITY

(71) Applicant: Microchip Technology Incorporated, Chandler, AZ (US)

(72) Inventors: Laurent Le Goffic, Nantes (FR); Sylvain Garnier, Nantes (FR)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 170 days.

(21) Appl. No.: 16/052,361

(22) Filed: Aug. 1, 2018

(65) Prior Publication Data
US 2019/0057044 A1 Feb. 21, 2019

Related U.S. Application Data

(60) Provisional application No. 62/547,092, filed on Aug. 17, 2017.

(51) Int. Cl.
*G06F 21/00* (2013.01)
*G06F 12/14* (2006.01)
(Continued)

(52) U.S. Cl.
CPC .......... *G06F 12/1425* (2013.01); *G06F 21/64* (2013.01); *G06F 21/79* (2013.01);
(Continued)

(58) Field of Classification Search
CPC ...... G06F 12/1425; G06F 21/64; G06F 21/79; G06F 2221/2113; G06F 2221/033; G06F 2212/1052; G06F 12/1441
See application file for complete search history.

(56) References Cited

U.S. PATENT DOCUMENTS

| | | | | |
|---|---|---|---|---|
| 5,303,392 A | * | 4/1994 | Carney | G06F 8/54 717/141 |
| 5,339,406 A | * | 8/1994 | Carney | G06F 11/0721 714/45 |

(Continued)

FOREIGN PATENT DOCUMENTS

KR   101591076 B1 *  2/2016

OTHER PUBLICATIONS

Park, Daejin et al., "A Safe Microcontroller with Silent CRC Calcuation Hardware for Code ROM Integrity Verification in IEC-60730 Class-B," The 1st IEEE Global Conference on Consumer Electronics, pp. 197-200, Oct. 1, 2012.
(Continued)

*Primary Examiner* — Mahfuzur Rahman
(74) *Attorney, Agent, or Firm* — Slayden Grubert Beard PLLC (57) ABSTRACT

A microcontroller configured to provide secure integrity checking of code or data stored in the microcontroller is provided. The microcontroller may include a processor, memory devices defining a microcontroller memory space, a security attribution unit defining secure memory region(s) and non-secure memory region(s) in the memory space, integrity check tables indicating storage locations of various code within the microcontroller memory space, and an integrity checking unit. The integrity checking unit may be configured to receive an integrity check request for checking the integrity of a first piece of code stored in the microcontroller memory space, access a first integrity check table that indicates a storage location of the first piece of code, determine whether the first integrity check table and first piece of code are stored in the same memory region; and determine whether to perform the requested integrity check based at least on this determination.

18 Claims, 5 Drawing Sheets

(51) Int. Cl.
  *G06F 21/64* (2013.01)
  *G06F 21/79* (2013.01)
(52) U.S. Cl.
  CPC ........... *G06F 2212/1052* (2013.01); *G06F 2221/033* (2013.01); *G06F 2221/2113* (2013.01)

(56) References Cited

U.S. PATENT DOCUMENTS

| | | | | |
|---|---|---|---|---|
| 5,982,294 | A * | 11/1999 | Takayama | H04W 88/026 340/7.32 |
| 2009/0307770 | A1 | 12/2009 | Harris et al. | 726/22 |
| 2011/0153690 | A1 * | 6/2011 | Allen | G06F 12/0269 707/816 |
| 2013/0111308 | A1 * | 5/2013 | Sauber | G06F 11/1004 714/807 |
| 2014/0115346 | A1 * | 4/2014 | Ekberg | G06F 21/10 713/193 |
| 2014/0281354 | A1 * | 9/2014 | Tkacik | G06F 12/1009 711/206 |
| 2014/0298039 | A1 * | 10/2014 | Pandya | G06F 12/1408 713/190 |
| 2015/0032976 | A1 | 1/2015 | Chapier et al. | 711/152 |
| 2015/0095661 | A1 * | 4/2015 | Sell | G06F 12/1408 713/193 |
| 2016/0085618 | A1 * | 3/2016 | MacKay | G06F 11/1004 714/807 |
| 2017/0262387 | A1 * | 9/2017 | Sell | G06F 9/45558 |
| 2018/0075241 | A1 * | 3/2018 | Gomez | G06F 21/565 |

OTHER PUBLICATIONS

International Search Report and Written Opinion, Application No. PCT/US2018/046841, 14 pages, dated Nov. 13, 2018.

* cited by examiner

FIG. 7

SYSTEMS AND METHODS FOR INTEGRITY CHECKING OF CODE OR DATA IN A MIXED SECURITY SYSTEM WHILE PRESERVING CONFIDENTIALITY

TECHNICAL FIELD

This application claims priority to U.S. Provisional Patent Application No. 62/547,092 filed Aug. 17, 2017, the entire contents of which are hereby incorporated by reference for all purposes.

TECHNICAL FIELD

The present disclosure relates to data security and data integrity, and more particularly, to systems and methods for checking integrity of code or data in a mixed security system (e.g., microcontroller) while preserving confidentiality.

BACKGROUND

Electronic devices often contain memory regions loaded with code (e.g., software or other code) and/or data (e.g., libraries) from multiple different parties. In certain instances, one or more parties may need to perform an integrity check of the code/data loaded by that party or by another party (e.g., a party having previously loaded its respective code/data. For example, for error prone memories such as flash memories, for example, an integrity check may be needed or recommended at several steps of a product lifecycle, e.g., at the end of production cycle, to ensure the non-volatile memory is not corrupted, and/or in the field, e.g., for mission critical devices. However, allowing a party to perform an integrity check of its respective software images loaded on a device may compromise the intellectual property of other parties having images loaded on the device. Further, in a secure system, the memory containing secure code or data is typically not readable from the outside the system or by unprivileged programs and thus it is typically impossible to verify the data directly.

As used herein, a "memory region" may include a partial or full storage area of a memory device (e.g., a ROM, RAM, Flash memory device, etc.) of an electronic device (e.g., a microcontroller). Each party that loads code and/or data in at least one memory region of a respective electronic device (e.g., a microcontroller) is referred to herein as a "code provider" or "provider" and the code and/or data loaded in the memory region(s) of the respective electronic device is often referred to herein as "provider code," which may be referred to as "loaded code" after being loaded in the respective memory device(s) of a respective electronic device.

To provide an example of a common situation, assume Provider A delivers a microcontroller preprogrammed with a proprietary software library (provider code) to another provider, Provider B, that uses this library to make its own products that are finally delivered to end customers. Further assume that Provider A sets security attributions of the microcontroller to prevent any read of the memory region containing its library. For example, Provider A may set memory region(s) of the microcontroller that contain its library as secure, while remaining memory regions of the microcontroller are set as (or default to) unsecure, thereby defining a "mixed security" system. Provider B may wish to check the integrity of the preprogrammed code from Provider A without accessing the data. Similarly, the end user may wish to check the integrity of all parts of the system, without needing access to the actual memory content. However, current systems typically do not allow for Provider B or the end user to perform such integrity checks without compromising the intellectual property of Provider A.

As used herein, a "mixed security" system contains secure and non-secure items, e.g., a mixture of secure and non-secure CPUs and/or a mixture of secure memory regions and non-secure memory regions. For example, a mixed security microcontroller (MCU) may include both secure memory regions and non-secure memory regions, e.g., according to static or dynamic security settings defined by the system, by a code provider, or by some other entity.

Figure 1:
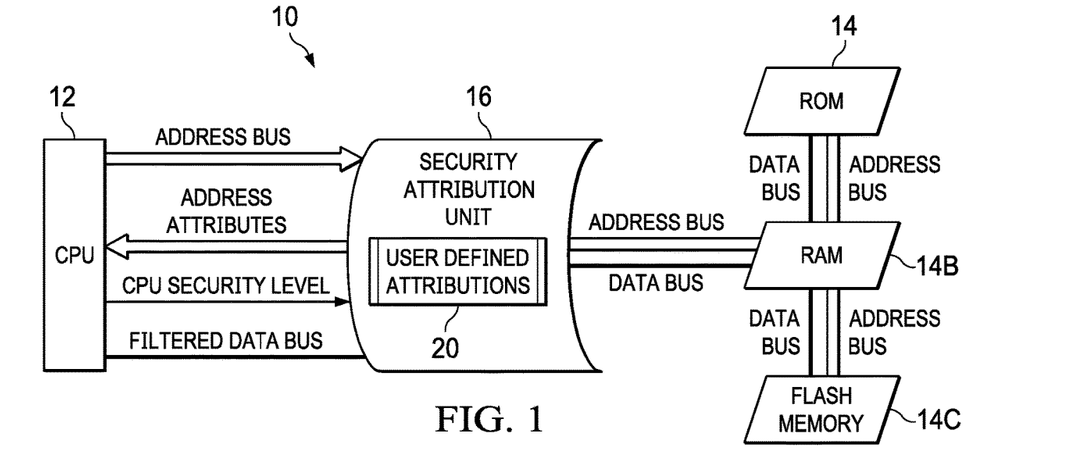
FIG. 1 shows an example mixed security microcontroller.

FIG. 1 shows an example mixed security system embodied as a microcontroller (MCU) 10 containing a CPU 12; memory devices 14 including a secure ROM 14A, a RAM 14B, and a Flash memory 14C; and a security attribution unit (SAU) 16. The example MCU 10 may be programmed by multiple code providers, and the security may also be customizable as discussed below.

The memory space of the MCU memory devices 10 may be partitioned into memory regions by security attribution unit 16. Security attribution unit 16 may store security attributions that define secure and non-secure memory regions, e.g., by defining boundaries of each memory region, a memory region number, and a security attribute or attributes for each memory region. In some embodiments, e.g., the embodiment shown in FIG. 1, the security attributions may be defined by one or more code providers (e.g., the first provider to load its code in the device memory), and such security attributes are thus indicated as user defined security attributes 20 in FIG. 1.

Security attribution unit 16 may be a hardware module or may be implemented by software. CPU 12 may have several security execution levels such that CPU 14 can access only certain memory region(s) of memories 14. This restriction may be enforced by security attribution unit 16.

As noted above, security attribution unit 16 may be configurable by a code provider programming device 10. In a typical scenario, each code provider will program one or more memory regions of one or more memory devices 14, and then set the user defined security attributes 20 to prevent access to these memory region(s) by another provider.

Figure 2:
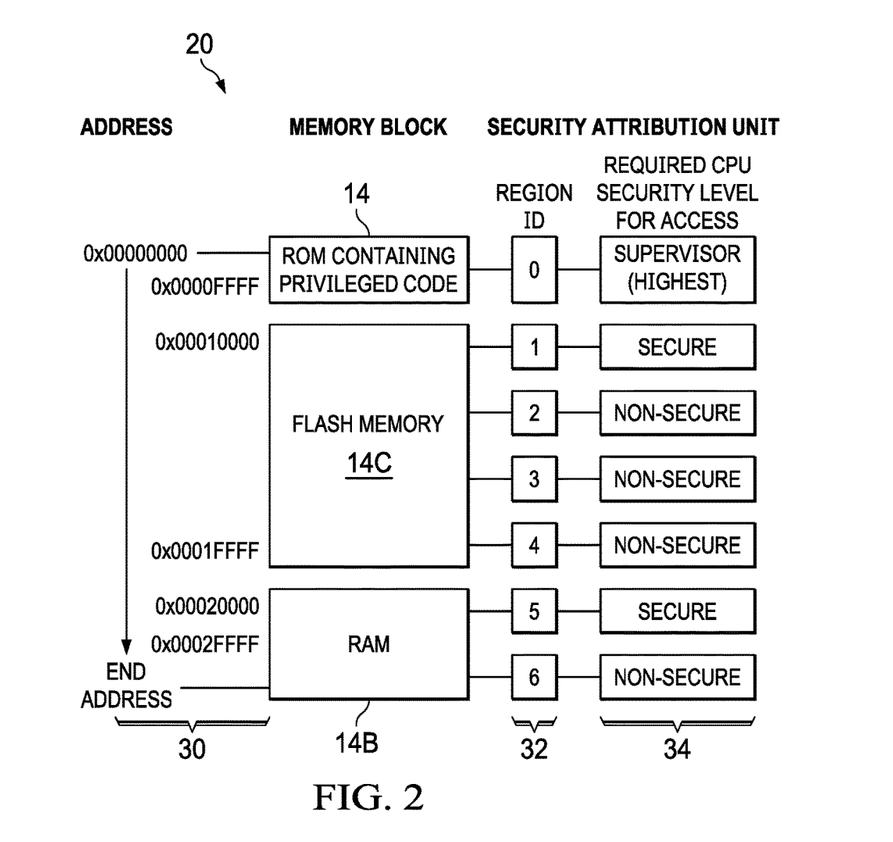
FIG. 2 illustrates an example mapping of security settings for the example MCU of FIG. 1, as defined by example user defined security attributes.

FIG. 2 illustrates an example mapping of security settings for the example MCU 10 defined by example user defined security attributes 20. As shown, the user defined security attributes 20 define address boundaries 30 for each of a plurality of memory regions, a region ID 32 for each memory region (in this example, Region IDs 0 through 6), and a required CPU security level 34 for accessing each respective memory region. In this example, the security attributes 20 specify (a) a supervisor (highest) security level for ROM 14A, (b) one secure and three non-secure regions within Flash 14C, and (c) one secure and one non-secure region within RAM 14B. With respect to the "supervisory" security level of ROM 14A, when CPU 12 executes code in the secure ROM 14A, the security level allows access to all memory address space of MCU 10, and thus such code in secure ROM 14A may be referred to as "supervisor" code.

Conventional systems, e.g., as discussed above, may have certain drawbacks or limitations. For example, the security partitioning of a device can be changed by individual code providers or other users of the device, which may leave the device susceptible to attack. In at least some cases, the integrity check process for checking the integrity of provider code loaded by one or more providers cannot rely on fixed addresses or a larger scale integrity check (i.e., checking the whole flash memory containing several images); thus, the address and size of the data region to check must be configurable. However, as the address and size of the target data can be changed, there is potential for a data leakage attack. In particular, by using successive integrity checks request on a very small region, a malicious user could guess the data residing in an area that he cannot access directly due to security restriction. (e.g., via a brute force attack where the expected cyclic redundancy check (CRC) is changed until there is a match).

An example conventional scenario is now discussed with reference to FIGS. 3 and 4.

As mentioned above, the user defined security attributions 20 in the security attribution unit (SAU) 16 define which memory regions of MCU 10 are secure and which are non-secure. These security attributions may be made by a first code provider, Provider A. For example, when the MCU 10 is delivered to Provider A, the memory devices 14 may be fully accessible from an external debugger/programmer. Provider A may load its provider code (e.g., software and/or data) into one or more memory regions in one or more memory devices 14 of MCU 10, set the security attributions 20 for the MCU (e.g., setting the memory region(s) containing Provider A's code as secure), and enable security enforcement. In this manner, Provider A may prevent the reading of its loaded code within the specified secure memory region(s).

Figure 3:
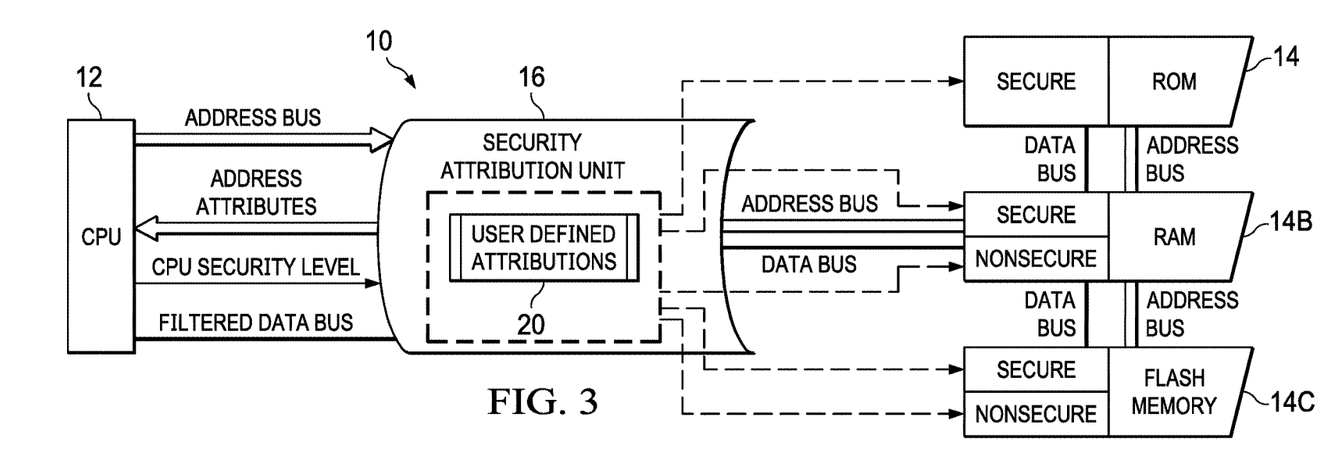
FIG. 3 shows example security attributions made by a first code provider of an MCU (Provider A).

FIG. 3 shows an example of security attributions 20 made by Provider A, according to an example conventional scenario. In one example, Provider A may load its provider code (e.g., a software library) into a region of Flash memory 14C and set the region as secure, as shown in FIG. 4. The MCU may then be delivered to another provider, Provider B, that may use Provider A's loaded code (software library) for some further use or development of the MCU.

Figure 4:
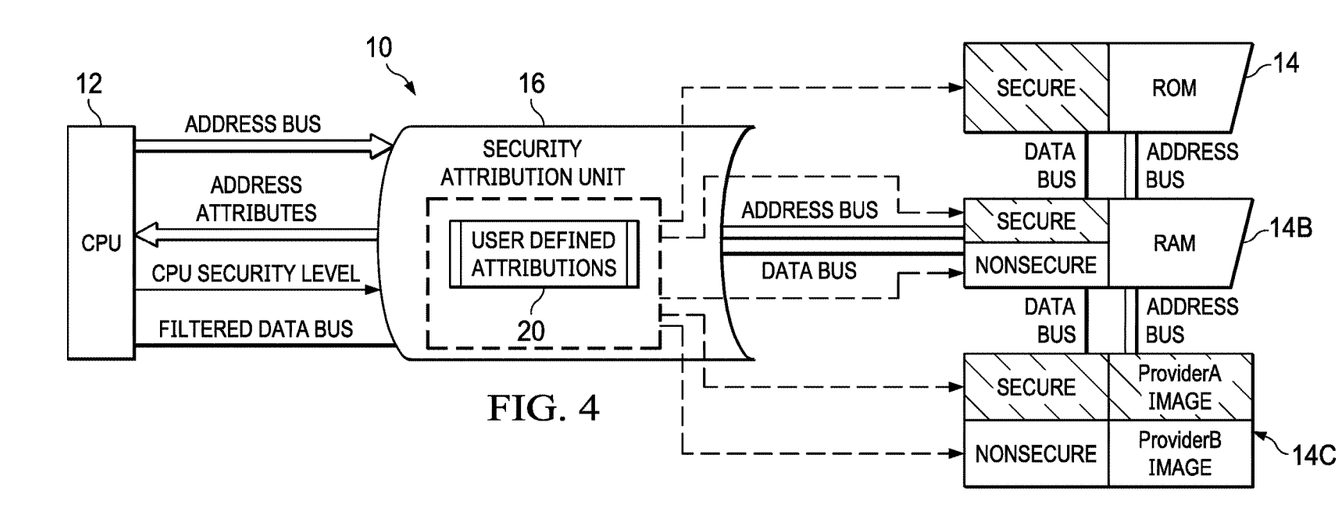
FIG. 4 illustrates the respective storage locations of software images loaded by two code providers (Provider A and Provider B) in the MCU of FIG. 3.

With reference to FIG. 4, Provider B may wish to ensure that all memories 14 of MCU 10 are correctly programmed and no errors are present, including the image previously loaded by Provider A. Provider B may store its own code in one or more memory regions. For example, as shown in FIG. 4, Provider B may store a software image in a non-secure memory region of Flash memory 14C.

As discussed above, the conventional approach may be problematic. First, security partitioning can be changed by code providers and/or other users of the device. An integrity check cannot rely on fixed addresses; rather, the address and size of the data region to check must be configurable to handle diverse development or use situations. However, as discussed above, allowing parties to configure or change the address and size of the secure and non-secure code stored in the device presents a risk of data leakage attack.

SUMMARY

Embodiments of the present disclosure provide systems and methods for storing and performing integrity checking of code in an electronic device, e.g., a mixed security microcontroller, while preserving confidentiality of the code.

One embodiment provides a microcontroller configured to provide secure integrity checking of code or data stored in the microcontroller. The microcontroller may include a processor; one or more memory devices collectively defining a memory space of the microcontroller, the memory space including a plurality of memory regions; a security attribution unit storing security attributes of each of the plurality of memory regions, the security attributes defining at least one secure memory region and at least one non-secure memory region; a plurality of integrity check tables, each integrity check table stored in one of the plurality of memory regions and including information indicating a storage location of a respective piece of code within the memory space of the microcontroller; and an integrity checking unit. The integrity checking unit may have access to the plurality of memory regions and may be configured to: receive an integrity check request for checking the integrity of a first piece of code stored in the memory space of the microcontroller; based on the received integrity check request, access a first integrity check table of the plurality of integrity check tables, the first integrity check table indicating a storage location of the first piece of code; determine whether the first integrity check table and the first piece of code are stored in the same memory region of the plurality of memory regions; determine whether to perform the requested integrity check based at least on the determination of whether the first integrity check table and the first piece of code are stored in the same memory region; and if it is determined to perform the requested integrity check, access and perform an integrity check of the first piece of code.

In one embodiment, the integrity checking unit has full access to all of the plurality of memory regions of the microcontroller.

In one embodiment, the integrity checking unit is further configured to determine, based on the first integrity check table, a particular memory region in which the first piece of code is stored; access, from the security attribution unit, security attributes of the particular memory region; and determine whether to perform the requested integrity check based at least on (a) the determination of whether the first integrity check table and the first piece of code are stored in the same memory region and (b) the security attributes of the particular memory region.

In one embodiment, the integrity checking unit is embodied as a hardware unit provided in addition to the one or more memory devices.

In one embodiment, the integrity checking unit is embodied by the processor executing code stored in a secure read-only memory (ROM) of the microcontroller.

In one embodiment, the integrity checking unit is further configured to, if it is determined not to perform the requested integrity check, communicate an error notification to a requestor of the integrity check request indicating a reason for denial of the requested integrity check.

In one embodiment, the integrity check table corresponding to each respective piece of code includes a header, information indicating a memory address of the respective piece of code, information indicating a size of the respective piece of code, and information indicating an expected result of an integrity check of the respective piece of code.

In one embodiment, the information indicating an expected result of an integrity check of the respective piece of code comprises a value of a hash or cyclic redundancy check (CRC).

In one embodiment, the security attributes of at least one of the plurality of memory regions are configurable or adjustable by a code provider that loads at least one piece of code in at least one memory device of the microcontroller.

In one embodiment, boundaries of at least one of the plurality of memory regions are configurable or adjustable by a code provider that loads at least one piece of code in at least one memory device of the microcontroller.

Another embodiment provides a method for providing secure integrity checking of code stored in a microcontroller including a processor and one or more memory devices collectively defining a memory space of the microcontroller, the memory space including a plurality of memory regions. The method may include storing in a security attribution unit of the microcontroller, security attributes of each of the plurality of memory regions, the security attributes defining at least one secure memory region and at least one non-secure memory region; storing a plurality of integrity check tables in the memory space of the microcontroller, wherein each integrity check table is stored in one of the plurality of memory regions and includes information indicating a storage location of a respective piece of code within the memory space of the microcontroller; and performing integrity check management process by an integrity checking unit of the microcontroller. The integrity check management process may include: receiving an integrity check request for checking the integrity of a first piece of code stored in the memory space of the microcontroller; based on the received integrity check request, accessing a first integrity check table of the plurality of integrity check tables, the first integrity check table indicating a storage location of the first piece of code; determining whether the first integrity check table and the first piece of code are stored in the same memory region of the plurality of memory regions; determining whether to perform the requested integrity check based at least on the determination of whether the first integrity check table and the first piece of code are stored in the same memory region; and if it is determined to perform the requested integrity check, accessing and performing an integrity check of the first piece of code.

In one embodiment of the method, the integrity checking unit has full access to all of the plurality of memory regions of the microcontroller.

In one embodiment of the method, the integrity checking unit of the microcontroller, the integrity check management process includes determining, based on the first integrity check table, a particular memory region in which the first piece of code is stored; accessing, from the security attribution unit, security attributes of the particular memory region; and determining whether to perform the requested integrity check based at least on (a) the determination of whether the first integrity check table and the first piece of code are stored in the same memory region and (b) the security attributes of the particular memory region.

In one embodiment of the method, the integrity checking unit configured to perform the integrity check management process comprises a hardware unit provided in addition to the one or more memory devices.

In one embodiment of the method, performing the integrity check management process by the integrity checking unit comprises the processor of the microcontroller executing code stored in a secure read-only memory (ROM) of the microcontroller.

In one embodiment of the method, performing, by the integrity checking unit of the microcontroller, the integrity check management process includes determining not to perform the requested integrity check, and in response, communicating an error notification to a requestor of the integrity check request indicating a reason for denial of the requested integrity check.

In one embodiment of the method, the integrity check table corresponding to each respective piece of code includes a header, information indicating a memory address of the respective piece of code, information indicating a size of the respective piece of code, and information indicating an expected result of an integrity check of the respective piece of code.

In one embodiment of the method, the information indicating an expected result of an integrity check of the respective piece of code comprises a value of a hash or cyclic redundancy check (CRC).

In one embodiment of the method, the method further includes configuring or adjusting security attributes of at least one of the plurality of memory regions based on input from a code provider that loads at least one piece of code in at least one memory device of the microcontroller.

In one embodiment of the method, the method further includes configuring or adjusting boundaries of at least one of the plurality of memory regions based on input from a code provider that loads at least one piece of code in at least one memory device of the microcontroller.

BRIEF DESCRIPTION OF THE FIGURES

Example embodiments are discussed below with reference to the drawings, in which.

DETAILED DESCRIPTION

Embodiments of the invention provide systems and methods for storing and performing integrity checking of loaded provider code in an electronic device (e.g., a microcontroller having a mixed security memory space) while preserving confidentiality of the loaded provider code, e.g., thereby protecting the intellectual property (e.g., software IP) of each code provider having code loaded on the electronic device. Some embodiments may address one or more of the problems or limitations of conventional techniques discussed above.

Figure 5:
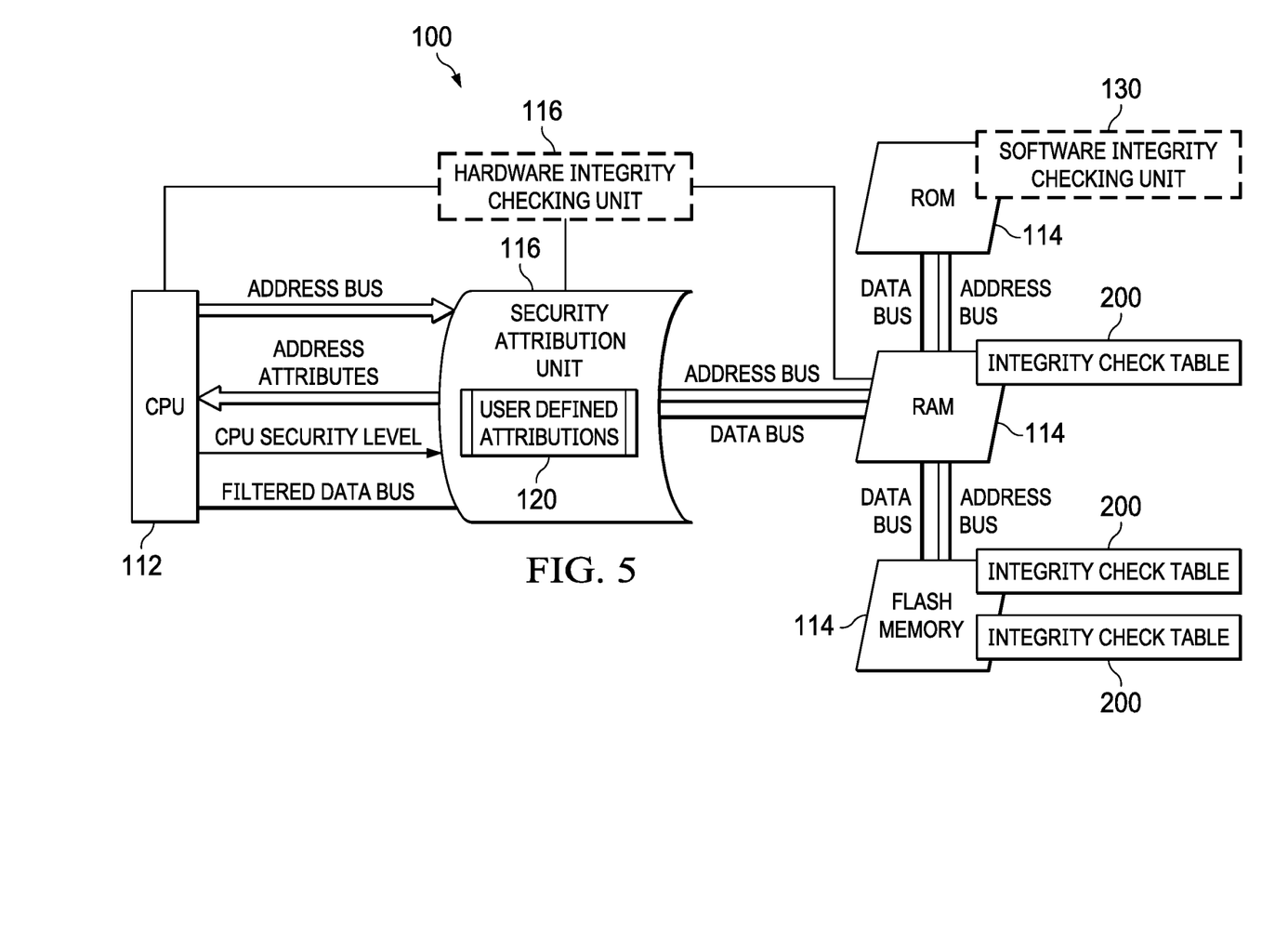
FIG. 5 illustrates an example microcontroller configured to securely store and perform integrity checking of loaded provider code in an electronic device, e.g., thereby preserving the confidentiality of loaded provider code, according to an example embodiment.

FIG. 5 illustrates an example microcontroller 100 configured to securely store and perform integrity checking of loaded provider code in an electronic device, e.g., thereby preserving the confidentiality of loaded provider code, according to an example embodiment. In this example, microcontroller 100 may include a CPU 112, memory devices 114 (including a ROM 114A, ROM 114B, and Flash memory device 114C), a security attribution unit 116 including user defined security attributes 120, and an integrity checking unit 130 for performing integrity checking of pieces of provider code loaded in the memory space of microcontroller 100. Integrity checking unit 130 may act as a trusted intermediary between the non-secure and secure world.

As discussed in more detail below, integrity checking unit 130 may be embodied in MCU 100 by hardware, software, firmware, or any combination thereof. For example, the integrity checking unit 130 may be embodied via CPU 112 executing code in a secure/supervisor ROM or a hardware device of MCU 100 having similar privileges. FIG. 5 indicates these two example implementations of integrity checking unit 130 using dashed boxes labelled "software integrity checking unit" and "hardware integrity checking unit."

In some embodiments, integrity checking unit 130 may be accessible by both secure and non-secure programs or debuggers, e.g., to allow both a secure software/debugger and a non-secure may to check integrity of provider code loaded on MCU 100. For a software implementation of integrity checking unit 130, access to integrity checking unit 130 may be provided by an Application Programming Interface (API) in unit 130. For a hardware implementation of integrity checking unit 130, access may be provided using registers.

Further, in some embodiments, integrity checking unit 130 is configured with full access to the complete memory map of MCU 100, including secure and non-secure memory regions. This may allow integrity checking unit 130 to read integrity check tables (discussed below) stored in memory of MCU 100, as well as the loaded code to be checked in order to perform an integrity check of the loaded code, e.g., by computing a hash or CRC. For a software implementation of integrity checking unit 130, full access to the complete memory map of MCU 100 may be provided using a secure function callable from both secure and non-secure code. For a hardware implementation of integrity checking unit 130, full access to the complete memory map of MCU 100 may be provided using a set of registers accessible from secure and non-secure software.

As noted above, integrity checking unit 130 may be embodied in MCU 100 by hardware, software, firmware, or any combination thereof. For example, integrity checking unit 130 may be embodied using a software program residing in a secure part of MCU 10 (e.g., a secure ROM having a highest (e.g., supervisor) security level), e.g. as indicated in FIG. 5 by the dashed box labelled "software integrity checking unit" located in ROM 14A. The software program can be called from secure and non-secure images of the device. The software program may also be callable from an external debugger, even when security is enforced on the device (lowest debug access level). Because the program resides in secure memory in this embodiment, CPU 112 has sufficient permissions to access the whole memory map of MCU 100 and can request memory region IDs to the security attribution unit 116.

In other embodiments, integrity checking unit 130 may be embodied using a dedicated hardware module mapped in the system, e.g. as indicated in FIG. 5 by the dashed box labelled "hardware integrity checking unit." The hardware module may include registers that are accessible from secure and non-secure software and also from an external debugger, including TABLEADDRESS registers and STATUS registers, for example. In one embodiment, the hardware module contains a finite state machine (FSM) with an access to the entire memory map and the security attribution unit 116 of MCU 100.

In some embodiments, integrity checking unit 130 may utilize integrity check tables 200 stored in respective memory regions of MCU 100, to implement a secure process for integrity checking of target memory addresses containing loaded provider code. Each integrity check table 200 may point to a respective piece of provider code and may include integrity check parameters defined by the respective provider, to thereby accommodate for variable memory region boundaries and/or security attributes. An integrity check table 200 for a respective piece of provider code may be placed by the respective provider in the memory region where the integrity check is needed. FIG. 5 illustrates example integrity check tables 200A and 200B stored in Flash memory 114C, and an example integrity check table 200C stored in RAM 114B.

Integrity checking unit 130 may use an integrity check table 200 corresponding to a respective piece of loaded code to perform an integrity check of the code. In one embodiment, for a respective piece of provider code stored in a target memory area (which may be contained within or coextensive with a single memory region, or may extend fully or partially across multiple memory regions, a corresponding integrity check table 200 may include at least the following:
   (a) A header, which may be used by integrity checking unit 130 to verify the validity of the integrity check table;
   (b) Information indicating a starting memory address of the target memory area containing the provider code to be checked;
   (c) Information indicating the size of the target memory area containing the provider code to be checked; and
   (d) Information indicating an expected result of the check of the provider code, e.g., an expected value of a hash or CRC of the target memory area.

An example integrity check table according to one embodiment is shown as Table 1.

TABLE 1

| Description | Header | Start Address | Size in bytes | Expected hash value |
| --- | --- | --- | --- | --- |
| Field | HRD | ADDR | SIZE | REFVAL |
| Offset | 0x0 | 0x4 | 0x8 | 0xC |
| Sample value | 0x43524349 | 0x00000000 | 0x100 | 0xAABBCCDD |

A requesting entity may submit an integrity check request to integrity checking unit 130 to check a particular piece of code stored in a respective memory area. The integrity check request may indicate the memory address of the corresponding integrity check table 200, such that integrity checking unit 130 may access the integrity check table 200 to realize the integrity check. Because the check is performed by a privileged process, confidential data is not exposed to unprivileged users or programs.

Integrity check unit 30 may analyze one or more factors and employ one or more rules for determining whether to perform a requested integrity check upon receiving a respective integrity check request for a piece of provider code loaded in a memory area of MCU 100.

For example, upon receiving an integrity check request for a target piece of code, integrity check unit 30 may determine whether the target piece of code and the integrity check table 200 corresponding with the target code are located in the same memory region. In one embodiment, integrity check unit 30 determines whether the target piece of code is fully contained within the same memory region in which the integrity check table 200 is located.

In some embodiments, the integrity check request may indicate the memory address of the integrity check table 200, which in turn may indicate the starting address and size of the target memory area (i.e., the memory area that contains the target code), such that integrity check unit 30 may determine whether the target code and the integrity check table 200 are located in the same memory region.

As another example, integrity check unit 30 may determine the security attributes of the target memory region (i.e., the memory region in which the target code is located).

Integrity check unit 30 may use one or both of these factors—i.e., (a) whether the target piece of code and the integrity check table 200 corresponding with the target code are located in the same memory region and/or (b) the security attributes of the target memory region—and/or one or more other factors as input factors for determining whether to perform a requested integrity check. Integrity check unit 30 may utilize one or both of these factor to prevent or help prevent a data guessing attack on the target memory area.

In a first example embodiment, integrity check unit 30 will perform a requested integrity check only if the target piece of code and the integrity check table 200 corresponding with the target code are located in the same memory region, regardless of the security attributes of the target memory region.

In a second example embodiment, integrity check unit 30 will perform a requested integrity check if either (a) the security level of the target memory region (e.g., as defined by user-define security attributes 120) is below a defined security level, e.g., if security attributes 120 define the target memory region as non-secure, or (b) the target piece of code and the integrity check table 200 corresponding with the target code are located in the same memory region. Thus, if the target code is located in a secure memory region, integrity check unit 30 will perform a requested integrity check on the target code only if the target code is located in the same memory region as the integrity check table 200.

Figure 6:
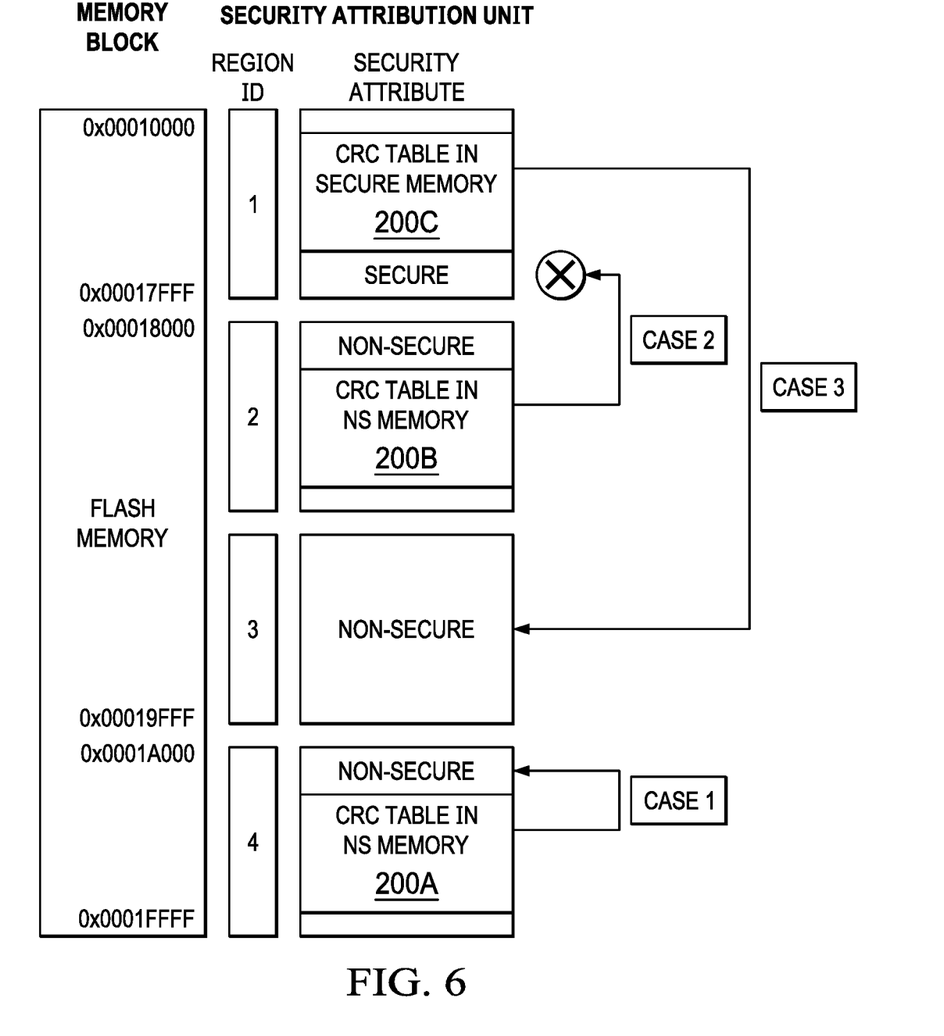
FIG. 6 illustrates the application of the example embodiments of an integrity checking unit, with respect to three example test cases, according to an example embodiment.

FIG. 6 illustrates the application of the first and second example embodiments discussed above, with respect to three example cases. FIG. 6 shows a Flash memory device 14C of an example MCU, in which the Flash memory 14C includes four defined memory regions having Region IDs 1, 2, 3, and 4. In this example, user-defined security attributes 120 specify Region 1 as a secure memory region, and Regions 2, 3, and 4 as non-secure memory regions.

The illustrated example shows three integrity check tables 200A, 200B, and 200C targeting three different memory areas (containing target code to be checked) within the memory regions of Flash memory 14C. The target memory area specified by each respective integrity check table is indicated by the curved arrow extending from each integrity check table. Thus, case 1 involves integrity check table 200A stored in non-secure memory Region 4 and targets a memory area within the same memory Region 4; case 2 involves integrity check table 200B stored in non-secure memory Region 2 and targets a memory area within secure memory Region 1; and case 3 involves integrity check table 200C stored in secure memory Region 1 and targets a memory area within non-secure memory Region 3.

First, cases 1-3 are analyzed with respect to the example first embodiment discussed above, in which integrity check unit 30 will perform a requested integrity check only if the target piece of code and the integrity check table 200 corresponding with the target code are located in the same memory region, regardless of the security attributes of the target memory region. According to the example first embodiment, case 1 is valid, and integrity check unit 30 will proceed with an integrity check upon receiving an integrity check request associated with table 200A. Case 2 is forbidden because the target memory area of table 200B is in a different memory region than table 200B, such that integrity check unit 30 will not proceed with an integrity check for an integrity check request associated with table 200B, and will instead return an error code or other notification to the requestor, which may indicate the reason for the denial of the request. Case 3 is also forbidden, because the target memory area of table 200C is in a different memory region than table 200C, such that integrity check unit 30 will not proceed with an integrity check for an integrity check request associated with table 200C, and will instead return an error code or other notification to the requestor.

Next, cases 1-3 are analyzed with respect to the example second embodiment discussed above, in which integrity check unit 30 will perform a requested integrity check if either (a) the security level of the target memory region (e.g., as defined by user-define security attributes 120) is below a defined security level, e.g., if security attributes 120 define the target memory region as non-secure, or (b) the target piece of code and the integrity check table 200 corresponding with the target code are located in the same memory region. According to the example second embodiment, case 1 is valid, and integrity check unit 30 will proceed with an integrity check upon receiving an integrity check request associated with table 200A. Case 2 is forbidden because the target memory area of table 200B is in a different memory region than table 200B, and the target memory area is located in a secure memory region (Region 1), such that integrity check unit 30 will not proceed with an integrity check for an integrity check request associated with table 200B, and will instead return an error code or other notification to the requestor, which may indicate the reason for the denial of the request. Case 3 is valid, because the target memory area of table 200C is located in a non-secure memory region (Region 3), and thus integrity check unit 30 will proceed with an integrity check upon receiving an integrity check request associated with table 200C.

Figure 7:
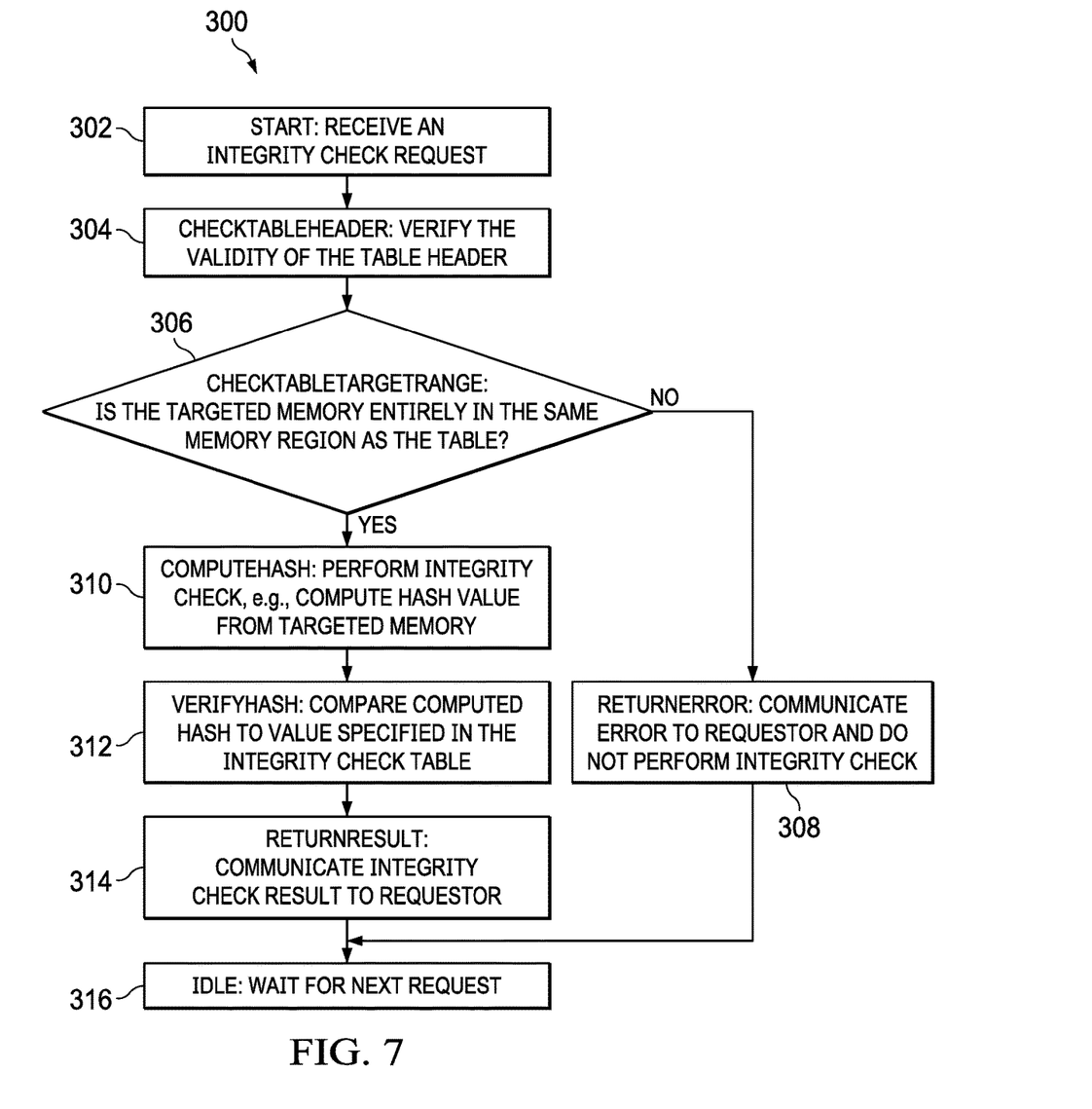
FIG. 7 illustrates an example integrity check routine that may be executed by an integrity checking unit, for both software and hardware implementations of the integrity checking unit, according to example embodiments.

FIG. 7 illustrates an example integrity check routine 300 that may be executed by integrity checking unit 130, for both software and hardware implementations of integrity checking unit 130, according to example embodiments.

At step 302: START, integrity checking unit 130 receives an integrity check request from software (secure or non-secure) or from an external debugger, wherein the request specifies the address of an integrity check table corresponding with a memory area (containing a piece of provider code) to be checked.

At step 304: CHECKTABLEHEADER, integrity checking unit 130 may verify the validity of the table header, e.g., to ensure the pointed memory is a proper table. This check is designed to make the process foolproof. That is, if an incorrect address (e.g., containing random data) is provided, the process reports an error instead of computing the CRC on a wrong area and reporting a failed integrity check.

At step 306: CHECKTABLETARGETRANGE, integrity checking unit 130 may determine whether the target memory area is entirely in the same memory region as the integrity check table. For example, to verify if the target memory area is in the same region, the ICU may request the region ID or security attribution of the start address and the end address (start+size) to the security attribution unit.

If the target memory area is not entirely in the same memory region as the integrity check table, integrity checking unit 130 determines not to proceed with the integrity check and returns an error code to the requestor, as indicated at step 308: RETURNERROR, and integrity checking unit 130 may return to an IDLE status indicated at 316.

At step 310: COMPUTEHASH, integrity checking unit 130 may compute a hash value from the targeted memory area.

At step 312: VERIFYHASH, integrity checking unit 130 may compare the computed hash value with an expected hash value result indicated in the integrity check table.

At step 314: RETURNRESULT, integrity checking unit 130 may return a result to the requestor (e.g., indicating a valid check or an error) based on the check at 310.

At step 316: IDLE, integrity checking unit 130 may wait for a next integrity check request.

Table 2 illustrates example implementations for the various steps discussed above, for both an example software-based implementation and an example hardware-based implementation of integrity checking unit 130.

TABLE 2

Example implementations of steps of routine 300 shown in FIG. 7.

| Step | Software implementation (CPU + SW) | Hardware implementation (FSM) |
|---|---|---|
| START | Call of the API | Write of the ADDRESS register |
| CHECKTABLEHEADER | CPU reads memory and compares against correct value | FSM reads system memory and compares against correct value |
| CHECKTABLETARGETRANGE | CPU retrieves the start and final address region IDs from the security attribution unit and compares it with the region ID of the table (on a CM23 CPU this is done using the "TestTarget" instruction) | FSM retrieves the start and final address region IDs from the security attribution unit and compares it with the region ID of the table |
| COMPUTEHASH | CPU reads memory and compute the hash using a software routine | FSM access the memory and compute hash using an hardware hash implementation |
| VERIFYHASH | Simple compare of the result of the hash | Simple compare of the result of the hash |
| RETURNRESULT | Return the result of the check to calling routine | Result is written to the STATUS register. When STATUS is read, enter the IDLE state. |
| IDLE | CPU exits the function | FSM is in the IDLE state |

The systems and methods disclosed above may be embodied in or employed by any suitable electronic devices, including for example, secure MCUs and/or MPUs. Specific examples include ARM Trustzone-M MCUs, such as SAML10 and SAML11, for example. However, the disclosed invention may be embodied in or employed by any other system that stores data from different providers wherein data confidentiality is a concern.

What is claimed is:

1. A microcontroller configured to provide secure integrity checking of code or data stored in the microcontroller, the microcontroller comprising:
   a processor;
   one or more memory devices collectively defining a memory space of the microcontroller, the memory space including a plurality of memory regions;
   a security attribution unit storing security attributes of each of the plurality of memory regions, the security attributes defining at least one secure memory region and at least one non-secure memory region;
   a plurality of integrity check tables, each integrity check table stored in one of the plurality of memory regions and including information indicating a storage location of a respective piece of code within the memory space of the microcontroller, wherein the integrity check table corresponding to a respective piece of code includes a header, information indicating a memory address of the respective piece of code, information indicating a size of the respective piece of code, and information indicating an expected result of an integrity check of the respective piece of code;
   an integrity checking unit having access to the plurality of memory regions and configured to:
      receive an integrity check request for checking the integrity of a first piece of code stored in the memory space of the microcontroller;
      based on the received integrity check request, access a first integrity check table of the plurality of integrity check tables, the first integrity check table indicating a storage location of the first piece of code;
      determine whether the first integrity check table and the first piece of code are stored in the same memory region of the plurality of memory regions;
      determine whether to perform the requested integrity check based at least on the determination of whether the first integrity check table and the first piece of code are stored in the same memory region; and
      if it is determined to perform the requested integrity check, access and perform an integrity check of the first piece of code.

2. The microcontroller of claim 1, wherein the integrity checking unit has full access to all of the plurality of memory regions of the microcontroller.

3. The microcontroller of claim 1, wherein the integrity checking unit is further configured to:
   determine, based on the first integrity check table, a particular memory region in which the first piece of code is stored;
   access, from the security attribution unit, security attributes of the particular memory region; and
   determine whether to perform the requested integrity check based at least on (a) the determination of whether the first integrity check table and the first piece of code are stored in the same memory region and (b) the security attributes of the particular memory region.

4. The microcontroller of claim 1, wherein the integrity checking unit is embodied as a hardware device provided in addition to the one or more memory devices.

5. The microcontroller of claim 1, wherein the integrity checking unit is embodied by the processor executing code stored in a secure read-only memory (ROM) of the microcontroller.

6. The microcontroller of claim 1, wherein the integrity checking unit is further configured to, if it is determined not to perform the requested integrity check, communicate an error notification to a requestor of the integrity check request indicating a reason for denial of the requested integrity check.

7. The microcontroller of claim 1, wherein the information indicating an expected result of an integrity check of the respective piece of code comprises a value of a hash or cyclic redundancy check (CRC).

8. The microcontroller of claim 1, wherein the security attributes of at least one of the plurality of memory regions are configurable or adjustable by a code provider that loads at least one piece of code in at least one memory device of the microcontroller.

9. A microcontroller configured to provide secure integrity checking of code or data stored in the microcontroller, the microcontroller comprising:
   a processor;
   one or more memory devices collectively defining a memory space of the microcontroller, the memory space including a plurality of memory regions, wherein boundaries of at least one of the plurality of memory regions are configurable or adjustable by a code provider that loads at least one piece of code in at least one memory device of the microcontroller;
   a security attribution unit storing security attributes of each of the plurality of memory regions, the security attributes defining at least one secure memory region and at least one non-secure memory region;
   a plurality of integrity check tables, each integrity check table stored in one of the plurality of memory regions and including information indicating a storage location of a respective piece of code within the memory space of the microcontroller;
   an integrity checking unit having access to the plurality of memory regions and configured to:
      receive an integrity check request for checking the integrity of a first piece of code stored in the memory space of the microcontroller;
      based on the received integrity check request, access a first integrity check table of the plurality of integrity check tables, the first integrity check table indicating a storage location of the first piece of code;
      determine whether the first integrity check table and the first piece of code are stored in the same memory region of the plurality of memory regions;
      determine whether to perform the requested integrity check based at least on the determination of whether the first integrity check table and the first piece of code are stored in the same memory region; and
      if it is determined to perform the requested integrity check, access and perform an integrity check of the first piece of code.

10. A method for providing secure integrity checking of code stored in a microcontroller including a processor and one or more memory devices collectively defining a memory space of the microcontroller, the memory space including a plurality of memory regions, the method comprising:
   storing, in a security attribution unit of the microcontroller, security attributes of each of the plurality of memory regions, the security attributes defining at least one secure memory region and at least one non-secure memory region;
   storing a plurality of integrity check tables in the memory space of the microcontroller, wherein each integrity check table is stored in one of the plurality of memory regions and includes information indicating a storage location of a respective piece of code within the memory space of the microcontroller;
   performing, by an integrity checking unit of the microcontroller, an integrity check management process including:
      receiving an integrity check request for checking the integrity of a first piece of code stored in the memory space of the microcontroller;
      based on the received integrity check request, accessing a first integrity check table of the plurality of integrity check tables, the first integrity check table indicating a first memory region in which the first piece of code is located and security attributes of the first memory region;
      determining whether the first integrity check table and the first piece of code are stored in the same memory region of the plurality of memory regions;
      determining whether to perform the requested integrity check based at least on (a) the determination of whether the first integrity check table and the first piece of code are stored in the same memory region and (b) the security attributes of the first memory region indicated in the first integrity check table, including:
         determining to perform the requested integrity check if at least one of (a) the first integrity check table and the first piece of code are stored in the same memory region or (b) the security attributes indicate the first memory region is non-secure; and
         determining not to perform the requested integrity check if both (a) the first integrity check table and the first piece of code are not stored in the same memory region and (b) the security attributes indicate the first memory region is secure; and
      if it is determined to perform the requested integrity check, accessing and performing an integrity check of the first piece of code.

11. The method of claim 10, wherein the integrity checking unit has full access to all of the plurality of memory regions of the microcontroller.

12. The method of claim 10, wherein the integrity checking unit configured to perform the integrity check management process comprises a hardware unit provided in addition to the one or more memory devices.

13. The method of claim 10, wherein performing the integrity check management process by the integrity checking unit comprises the processor of the microcontroller executing code stored in a secure read-only memory (ROM) of the microcontroller.

14. The method of claim 10, wherein performing, by the integrity checking unit of the microcontroller, the integrity check management process includes determining not to perform the requested integrity check, and in response, communicating an error notification to a requestor of the integrity check request indicating a reason for denial of the requested integrity check.

15. The method of claim 10, wherein the integrity check table corresponding to each respective piece of code includes a header, information indicating a memory address of the respective piece of code, information indicating a size of the respective piece of code, and information indicating an expected result of an integrity check of the respective piece of code.

16. The method of claim 10, wherein the information indicating an expected result of an integrity check of the respective piece of code comprises a value of a hash or cyclic redundancy check (CRC).

17. The method of claim 10, further comprising configuring or adjusting security attributes of at least one of the plurality of memory regions based on input from a code provider that loads at least one piece of code in at least one memory device of the microcontroller.

18. The method of claim 10, further comprising configuring or adjusting boundaries of at least one of the plurality of memory regions based on input from a code provider that loads at least one piece of code in at least one memory device of the microcontroller.

* * * * *